United States Patent [19]

Rosseau

[11] 4,165,551
[45] Aug. 28, 1979

[54] ROTARY BRUSH ROLL CONSTRUCTION

[75] Inventor: Richard B. Rosseau, Claremont, Calif.

[73] Assignee: FMC Corporation, San Jose, Calif.

[21] Appl. No.: 865,146

[22] Filed: Dec. 28, 1977

Related U.S. Application Data

[62] Division of Ser. No. 656,473, Feb. 9, 1976, Pat. No. 4,104,760.

[51] Int. Cl.$^2$ ............................................. A46B 13/02
[52] U.S. Cl. ...................................... 15/179; 29/117; 29/123
[58] Field of Search ................... 15/179–183, 15/49 C, 50 C, 21 D, 77, 53 A, 53 AB; 29/123, 115, 117

[56] References Cited

U.S. PATENT DOCUMENTS

| | | | |
|---|---|---|---|
| 2,749,133 | 6/1956 | Rich | 29/123 X |
| 2,907,063 | 10/1959 | Jones | 15/182 |
| 2,924,838 | 2/1960 | Jones et al. | 15/182 |
| 3,134,123 | 5/1964 | Nelson | 15/182 |
| 3,329,986 | 7/1967 | Hackworth | 15/179 |
| 3,512,200 | 7/1970 | English et al. | 15/179 X |
| 3,694,844 | 10/1972 | Welter | 15/182 |
| 3,990,391 | 11/1976 | Singh | 29/123 |

*Primary Examiner*—Peter Feldman
*Attorney, Agent, or Firm*—R. S. Kelly

[57] ABSTRACT

A rotary brush includes a generally cylindrical, sheet metal core having fittings arranged to be inserted into both ends thereof for the reception of conventional brush drive means, e.g., a rotating drive shaft adapted to extend through the core or stub shafts which are adapted to extend only into the ends of the core. The fittings are comprised of an elastomeric material having a Shore scale A hardness within the range of from about 85–100, and the tubular core is provided with radially inwardly extending circumferentially spaced projections adjacent each end thereof which are adapted to slidably fit within axially extending grooves formed in the outer surface of the fitting and to resiliently engage the fitting to thus lock the fitting against relative rotation. The fittings, which are adapted to be snugly and resiliently secured to the aforementioned brush drive means, may be readily replaced when desired simply by sliding them out of the ends of the core.

2 Claims, 8 Drawing Figures

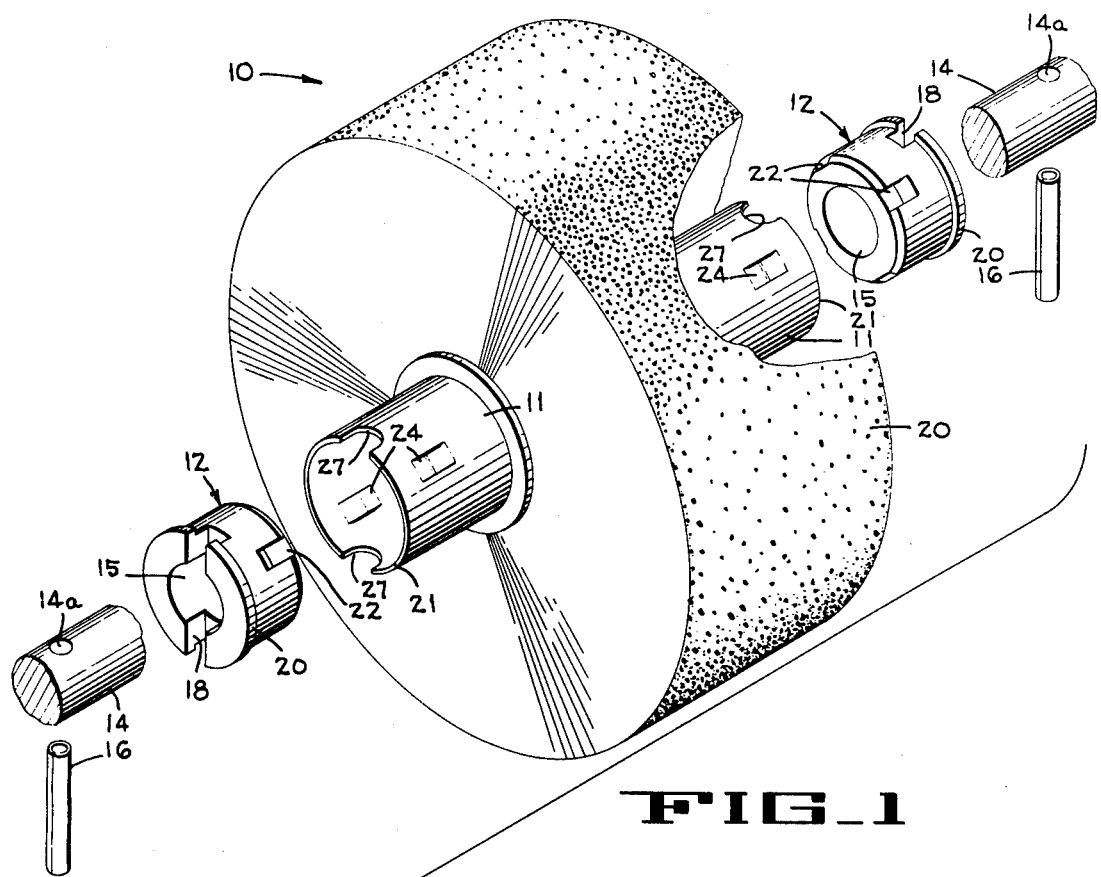
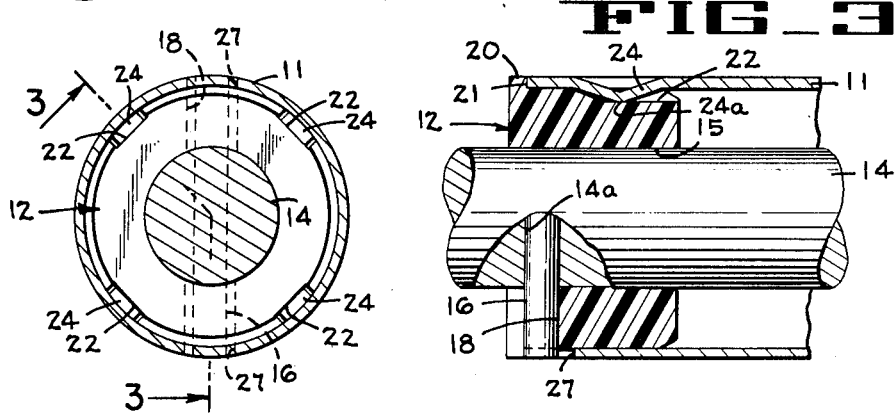

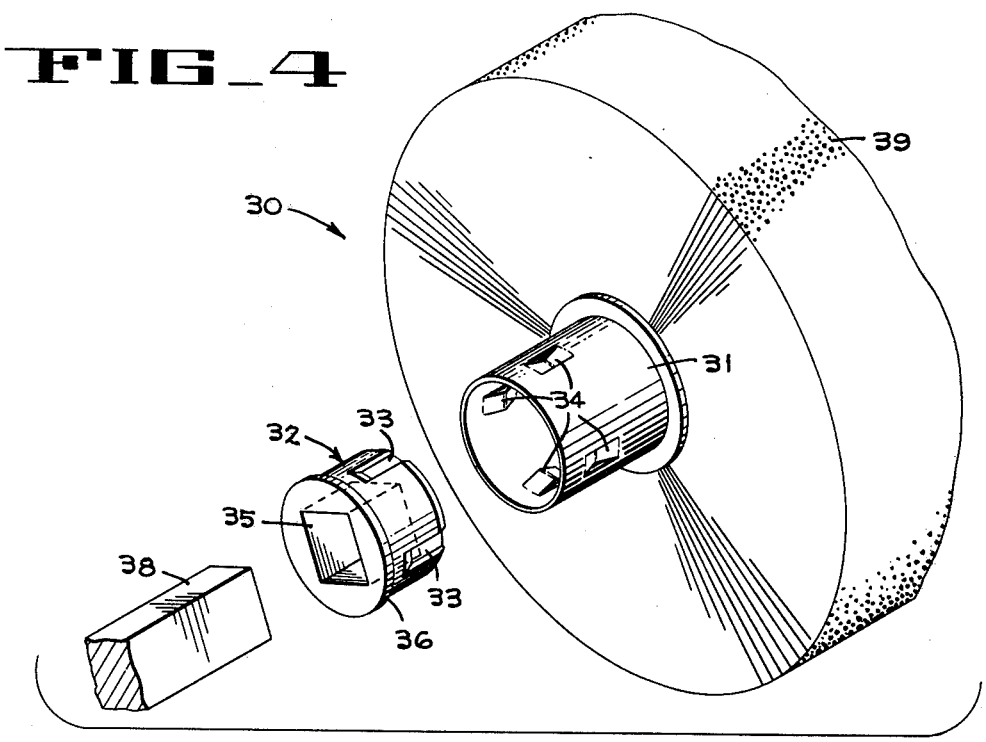
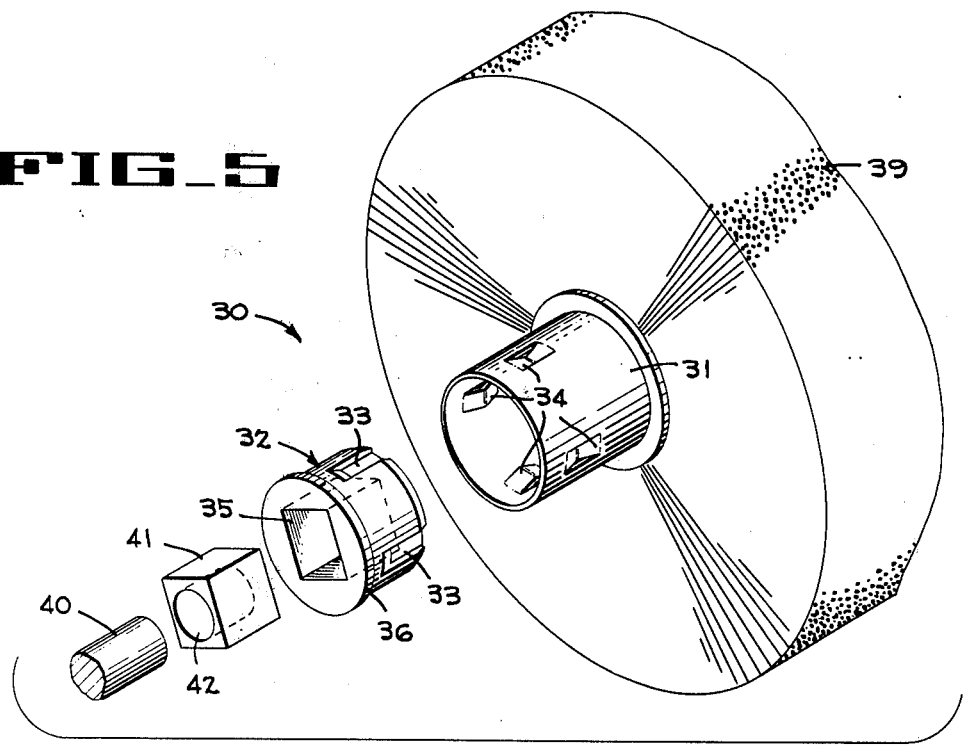

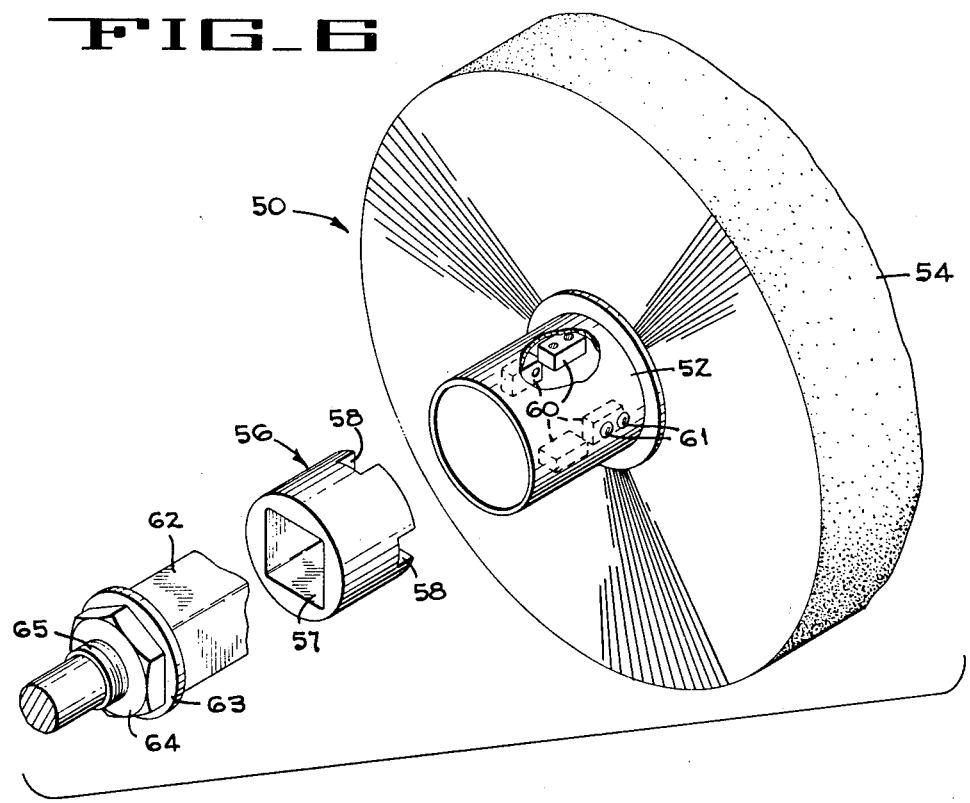
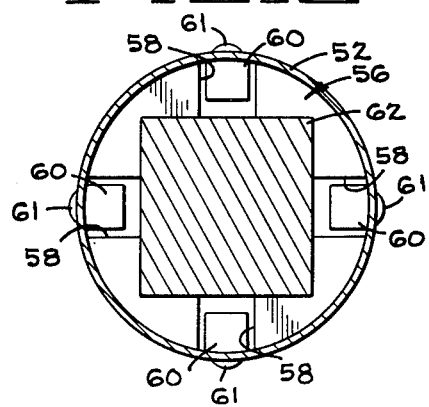
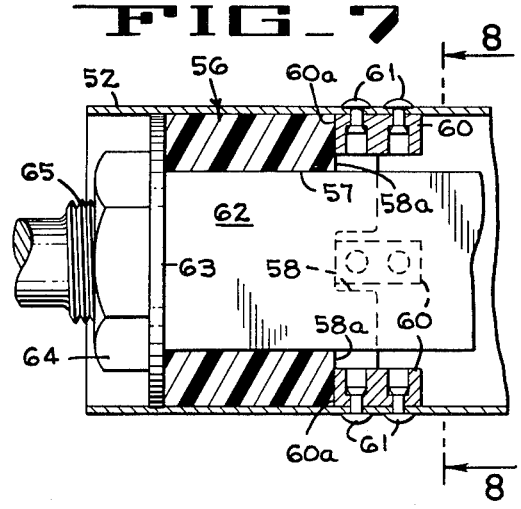

ROTARY BRUSH ROLL CONSTRUCTION

This is a division, of application Ser. No. 656,473, now U.S. Pat. No. 4,104,760 filed Feb. 9, 1976.

BACKGROUND OF THE INVENTION

1. Field of the Invention

The present invention pertains to rotary brushes, and more particularly, it pertains to means for providing reliable and long lasting drive connections for such rotary brushes.

2. Description of the Prior Art

In typical brush roll constructions of the prior art, e.g., in the brush rollers used for washing or waxing fresh fruit and vegetables, cylindrical core elements of relatively thin sheet stock material were provided which had narrow brush strips helically wound or otherwise tightly applied to the outer cylindrical surface thereof. At the ends of the core metallic fittings were provided which were generally cylindrical in shape and adapted to be press fitted or otherwise securely and permanently inserted into the ends of the core. Each of such metallic fittings typically included a radially extending flange at the outer end thereof to secure the fitting in the core in a predetermined axial position. Such brush roll construction is shown, for example, in the prior U.S. Pat. Nos. to Jones et al 2,924,838 or English et al 3,512,200. The inner portion of each fitting was provided with an axially extending passage to receive the drive pin or drive shaft, and, in a typical drive arrangement, this recess might be non-cylindrical in cross section so as to provide a positive drive connection to the fitting.

In such conventional prior art brush roll constructions both the drive means and the fittings were formed of metallic materials which created two serious problems. The wear on the fittings was great, and frequently the fittings would wear out before the brushes. Also, the noise generated by the metal to metal contact proved to be very objectionable under certain circumcircumstances particularly when many such brush drive arrangements were arranged in tandem—as in fruit and vegetable washing or waxing machines for example.

In other brush roll constructions, particularly where the drive shaft was arranged to extend through the core, keys and set screws were utilized to secure the metallic end fittings to the drive shaft. In such arrangements excessive wear on the set screws and keys would necessitate their frequent adjustment and/or replacement. Such brush roll construction is shown, for example, in U.S. Pat. No. 2,907,063 to Jones.

An improvement over the aforedescribed conventional metal-to-metal drive fitting for brush roller cores has been the use of a fitting comprised of an elastomeric material which can be provided with an axially extending passage which will snugly and yieldably engage the drive means thereby eliminating the excessive wear and noise problems of the metal fittings. Such fittings have proven to be very popular, but, prior to the present invention, no satisfactory way has been found to provide for the ready removal and replacement of such fittings. This has proven to be necessary since the brushes will typically wear faster than the fittings, and it has been found to be economically advantageous to replace only the worn brush strip and the relatively inexpensive sheet metal core.

SUMMARY OF THE INVENTION

In the brush roll construction of the present invention, the conventional cylindrical core is provided with fittings of elastomeric material which are adapted to be slidable into and out of the open ends of the core. In order to provide a suitable drive connection and also the required resiliency, the elastomeric material of the fittings should have a Shore scale A hardness within the range of from about 85 to about 100. The core is provided with radially inwardly extending and circumferentially spaced projections on each end thereof which are arranged to be received within axially extending recesses on the exterior surface of the fittings so as to prevent relative rotation between the fittings and core but so as to allow for the axial displacement thereof after the removal of the drive connections. Means are provided to retain the fittings in a predetermined position within the ends of the core so that the inwardly extending projections of the core are in resilient engagement with the fittings. This retaining means is secured to the rotatable driving or support means and is adjustably movable with respect thereto for applying axial pressure to the fitting to force it into axial resilient engagement with the inwardly extending projections of the core. Thus, conventional drive pins or drive shaft means can be snugly inserted within axially extending passages in the elastomeric fittings so as to provide a positive and noise free drive connection to the brush roller. If it is desired to replace the core and the worn brush elements thereon the drive means is removed, the fittings are rapidly slid out of the core, and the fittings are then ready to be slidably inserted in a new core.

BRIEF DESCRIPTION OF THE DRAWINGS

FIG. 1 is an exploded isometric view of a rotary brush utilizing the brush core construction of the present invention.

FIG. 2 is an enlarged transverse section through the core element of the brush shown in FIG. 1.

FIG. 3 is a section taken along the line 3—3 of FIG. 2.

FIG. 4 is an exploded isometric view of a modified embodiment of the present invention particularly illustrating the fitting and drive arrangement at one end of the brush core.

FIG. 5 is an exploded isometric view similar to FIG. 4 but illustrating a further embodiment of the present invention.

FIG. 6 is an exploded isometric view similar to FIGS. 4 and 5 but showing a still further embodiment of the present invention.

FIG. 7 is an enlarged partial longitudinal section through an end of the core element of the brush shown in the embodiment of FIG. 6.

FIG. 8 is a transverse section taken along the line 8—8 of FIG. 7.

DESCRIPTION OF THE PREFERRED EMBODIMENTS

In the embodiment of the invention shown in FIG. 1, the brush roll 10 will be seen to comprise an open-ended, tubular, thin-walled core 11 which is provided with a pair of fittings 12 insertable into the open ends thereof. The fittings are adapted to provide a positive drive connection between the brush roll and a drive shaft 14 which is arranged to extend entirely through the core and which is conventionally driven (by means not shown). Each fitting 12 is provided with an axially extending passageway 15 of generally cylindrical cross-sectional shape which is arranged to snugly receive the drive shaft 14, as shown in FIG. 3. The drive connection between the drive shaft and the fittings is provided by the snug fit of the fittings on the drive shaft and by conventional split roll pins 16 which extend transversely through holes 14a in the drive shaft and which are arranged to be received within a pair of oppositely positioned, radially extending slots 18 provided at the outer end of each of the fittings. It will further be noted that the slotted, outer end of each of the fittings is provided with a radially extending flange 20 so that the fitting can be located in a predetermined position within the core when the flange abuts against the narrow end surface 21 of the core. Each fitting is further provided with a plurality of axially extending and circumferentially spaced grooves 22 (two being shown in the embodiment of FIG. 1) which are adapted to resiliently receive radially inwardly projecting tangs 24 provided at the ends of the core. Affixed to the outer cylindrical surface of the core is a brush member 20 which may be of any suitable construction (such as in the form of a helical brush strip) and which may be securely attached to the surface of the core in any desired manner.

The metallic core element 11 is generally conventional in brush rolls of the type described (except for the provision of the inwardly extending tangs 24) and is preferably formed of readily available sheet stock material. Typically, this sheet metal material might comprise 0.05 inch wall steel or aluminum for brush roll cores of from two to five inch diameters although wall thicknesses of 0.1 inches or more might be used for heavier duty brush rolls. The tangs 24 are struck out of the sheet metal material of the core in a conventional punch press operation so that the inwardly extending ridges 24a of the tangs (FIG. 3) will yieldably engage the surfaces of the grooves 22 in the fittings 12 to provide positive drive engagement. The tangs will therefore yield slightly when the fittings are pressed into the ends of the core. This press fit should not be so tight, however, as to prevent the fittings from being readily removable from the cores when it is desired to replace the worn brush member and its supporting core.

The fittings 12, which comprise the key elements of the present invention, are formed of an elastomeric material, such as polyurethane, having a Shore scale A hardness within the range of from about 85–100. Preferably the hardness of the fittings should be around 92–95 Shore-A. When the hardness is increased significantly from this preferred range, the fitting becomes stronger and will take more torque, but it is not flexible enough to permit easy installation and proper press fit engagement with the inwardly projecting tangs 24 of the core 11. Fittings of 65–70 Shore scale D hardness were tried and were found to be too hard. If the casting is made softer, e.g., in the Shore-A 70 range, the material has been found to be too flexible and to not provide the requisite driving torque.

In assembling the brush roll construction of FIG. 1, the fittings 12 are first slidably inserted into the ends of the core 11 with the grooves 22 thereof being aligned with the inwardly projecting tangs 24 of the core and with the slots 18 being aligned with slots 27 (FIG. 1) cut into the end wall surface 21 of the core. The assembled brush roll is then slid onto the drive shaft, and the slots 18 and 27 are aligned with the holes 14a provided in the drive shaft so that the split roll pins 16 can be hammered through the shaft to insure positive drive engagement with the fittings. As previously pointed out, the drive shaft 14 fits snugly within the axially extending passages 15 of the fittings so as to provide a positive drive connection under low speed and low load conditions. Also, it will be noted that all connections between the drive shaft and the brush roll 10 are made through the fittings 12 so as to eliminate the noise problems encountered in prior art metal-to-metal drive arrangements.

A modified embodiment of the invention is shown in FIG. 4. The brush roll 30, only one end of which is shown in FIG. 4, will be seen to be generally similar to the brush roll 10 of the previously described embodiment and to include a cylindrical core 31 having a brush member 39 tightly secured to the outer cylindrical surface thereof. The core is adapted to receive elastomeric fittings 32 (only one being shown in FIG. 4) within each end thereof. The fittings are provided with axially extending, circumferentially spaced grooves 33, similar to the grooves 22 of the fittings 12, which are arranged to receive inwardly projecting tangs 34 provided at the ends of the core—such tangs being similar in all respects to the tangs 24 previously described.

The essential difference between the FIG. 4 embodiment of the invention and the FIG. 1 embodiment of the invention is that the brush roll in FIG. 4 is adapted to be driven by stub shafts, or drive pins, 38 (one only being shown in FIG. 4) which extend only into the fitting and not through the core as in the previously described embodiment. It will be noted that the drive pin 38 is square in cross-sectional configuration and is adapted to be received within a similarly shaped square recess 35 which extends axially into but not through the fitting. It will be obvious that any other non-cylindrical cross-sectional shape could be utilized for the recess in the fitting in order to accommodate a similarly shaped drive pin and provide a positive drive connection therebetween.

In assembling the FIG. 4 embodiment of the invention, the fittings 32 are slidably inserted into the core 31 in the same manner as that previously described until the flanges 36 thereof abut against the annular end wall of the core. The drive pins 38 are typically arranged so that one of such pins (which may or may not be driven) will be retractable to allow the brush roll to be slipped between the pins. The retracted pin is then allowed to slide forwardly so that it is snugly engaged within the recess 35 in the fitting with the end of the pin being in abutment with the end wall at the inner end of the recess.

Another modification of the present invention is shown in FIG. 5. This embodiment of the invention is similar in all respects to the FIG. 4 embodiment except that the brush roll 30 is designed to be driven by cylindrical drive pins, or stub shafts, 40 rather than by the non-cylindrical drive pins 38 of the FIG. 4 embodiment. Thus, a special insert plug 41 is provided which is formed of the same elastomeric material as the fitting 32 and which is adapted to be snugly secured within the recess 35 within the fitting. Plug 41 is provided with an axially extending passageway 42 of cylindrical cross-section to mate with the outer cylindrical surface of the drive pin 40 so that the drive pin can be snugly secured within the fitting in the same manner as that described hereinbefore.

A still further embodiment of the invention is disclosed in FIGS. 6, 7 and 8. The brush roll 50 shown therein will be seen to be comprised of a tubular thin-walled core member 52 of cylindrical shape having brush means 54 secured to the outer cylindrical surface thereof and extending radially outwardly therefrom in the conventional manner. Fittings 56 of the previously described elastomeric material (one only being shown in FIG. 6) are arranged to be loosely received within each end of the core to provide a positive drive connection between the brush roll and a drive shaft 62 that extends through the core in a manner generally similar to that of the previously described FIG. 1 embodiment of the invention. It will be noted that each fitting is provided with an axially extending passageway 57 of a non-cylindrical cross-sectional shape designed to match the non-cylindrical cross-sectional configuration of the central portion of the drive shaft 62 so that the fittings can be snugly received upon the drive shaft in driving engagement therewith. The inwardly extending end of the fitting is provided with a plurality of axially extending and circumferentially spaced slots 58 which are adapted to receive a plurality of lugs 60 provided in circumferentially aligned arrangement upon the interior cylindrical wall of the core member 52. As best shown in FIG. 7, the metallic lugs 60 are secured by rivets 61 to the wall of the core and are positioned so that the transversely extending inner end surface 58a of the fitting can be jammed into resilient engagement with the end surfaces 60a (FIG. 6) of the lugs.

In assembling the brush roll arrangement of FIG. 6, the fittings 56 are first loosely slid into the ends of the core 52, and, as shown in FIG. 7, the lugs 60 are provided at positions within the core such that the fitting will be entirely received within the core when it abuts the lugs. The brush roll 50 is then slipped over the drive shaft 62. At each end of the drive shaft a washer 63 and a nut 64 are provided with the nut being adjustably secured to the shaft by means of a threaded section 65 provided on the shaft so that the washer can be securely clamped against the outer end face 59 of the fitting to thereby resiliently jam the fitting against the end surfaces 60a of the lugs 60. Thus, by tightening the nuts 64 on the drive shaft the fittings can be locked in a predetermined position with respect to the core and in tight positive drive engagement with the lugs. As shown in FIG. 7, the entire drive connection, including the fitting 56, washer 63 and nut 64, is received within the tubular confines of the core to keep it out of direct contact with potentially damaging substances which may drip past the ends of the core.

From the foregoing description it will be seen that a brush roll construction is provided by the present invention which is designed to provide a reliable and positive drive connection between the roll and the conventional brush roller driving means without the noise and wear problems generally encountered in conventional prior art drive arrangements. The fittings, which should have a substantial long life, are readily replaceable within the tubular core elements of the brush rolls so that only the relatively low cost brush rolls need be replaced upon the wearing of the bristles thereof. Such replacement can be accomplished quite easily and quickly by relatively unskilled labor and without requiring any special tools.

Although the best modes contemplated for carrying out the present invention have been herein shown and described, it will be apparent that modification and variation may be made without departing from what is regarded to be the subject matter of the invention.

I claim:

1. In a rotary brush roller comprised of a tubular open-ended metallic core of cylindrical shape having brush means secured to its outer cylindrical surface and extending radially therefrom, the improvement comprising a pair of fittings arranged to be received in each end of said core, each of said fittings being comprised of an elastomeric material having a Shore scale A hardness within the range of from about 85 to about 100, each of said fittings having an axially extending passage therein arranged to snugly receive a rotatable driving or support means, said core at each end thereof having a plurality of radially inwardly projecting elements spaced circumferentially about the interior cylindrical wall of said core, each of said fittings having a plurality of circumferentially spaced and axially extending recessed portions arranged to be received by said inwardly projecting elements of the core when said fitting is axially slidably assembled within said core, and means for retaining said fittings in a predetermined position within the ends of said core so that said inwardly projecting elements of the core are in resilient engagement with said fittings, said means for retaining each of said fittings in said core comprising means secured to said rotatable driving or support means and being adjustably movable with respect thereto for applying axial pressure to said fitting to force it into axial resilient engagement with said inwardly projecting elements of said core.

2. In a rotary brush roller as set forth in claim 1, wherein said inwardly projecting elements comprise metallic lugs fastened to said interior wall of said core.

* * * * *